(12) United States Patent
Okada et al.

(10) Patent No.: US 6,618,502 B1
(45) Date of Patent: Sep. 9, 2003

(54) COLOR IMAGE PROCESSING METHOD AND APPARATUS

(75) Inventors: Fujio Okada, Saitama-ken (JP); Mitsuhisa Nakagawa, Kangawa-ken (JP); Keiichi Negishi, Kanagawa-ken (JP)

(73) Assignee: Fuji Photo Optical Co., Ltd., Saitama-ken (JP)

( * ) Notice: Subject to any disclaimer, the term of this patent is extended or adjusted under 35 U.S.C. 154(b) by 0 days.

(21) Appl. No.: 09/409,661

(22) Filed: Sep. 30, 1999

(30) Foreign Application Priority Data

Sep. 30, 1998 (JP) .............................. 10-277319

(51) Int. Cl.[7] .................................................. G06K 9/00
(52) U.S. Cl. ...................... 382/167; 348/225.1; 348/647
(58) Field of Search .............................. 382/162, 167; 358/520, 516, 518, 515, 521; 348/645–649, 29, 34, 272, 273, 255, 256, 655, 223.1, 225.1, 228.1, 229.1, 603, 224.1

(56) References Cited

U.S. PATENT DOCUMENTS

| | | | | |
|---|---|---|---|---|
| 5,168,532 A | * | 12/1992 | Seppi et al. | 348/217 |
| 6,040,858 A | * | 3/2000 | Ikeda | 348/242 |
| 6,111,607 A | * | 8/2000 | Kameyama | 348/256 |

FOREIGN PATENT DOCUMENTS

| | | | | |
|---|---|---|---|---|
| JP | 405022670 A | * | 1/1993 | H04N/5/335 |
| JP | 408037603 A | * | 2/1996 | H04N/1/60 |
| JP | 409200617 A | * | 7/1997 | H04N/5/335 |
| JP | 410257515 A | * | 9/1998 | H04N/9/68 |

* cited by examiner

*Primary Examiner*—Amelia M. Au
*Assistant Examiner*—Colin LaRose
(74) *Attorney, Agent, or Firm*—Joseph Levi; Clifford Chance US LLP

(57) ABSTRACT

In a first signal suppressing process, in cases where a signal level of a certain color signal among color signals obtained from an image sensing operation is higher than a predetermined signal level, the certain color signal is suppressed. An image sensing operation with a comparatively large exposure quantity and an image sensing operation with a comparatively small exposure quantity are performed alternately. It is detected that suppression of a certain color signal is performed in the first signal suppressing process when the image sensing operation with a comparatively large exposure quantity is performed. A calculation is made to find composition ratios of the color signals, which are obtained from the image sensing operation with a comparatively small exposure quantity. A second signal suppressing process is performed for suppressing at least one color signal other than the certain color signal such that the composition ratios become identical with the calculated composition ratios.

4 Claims, 8 Drawing Sheets

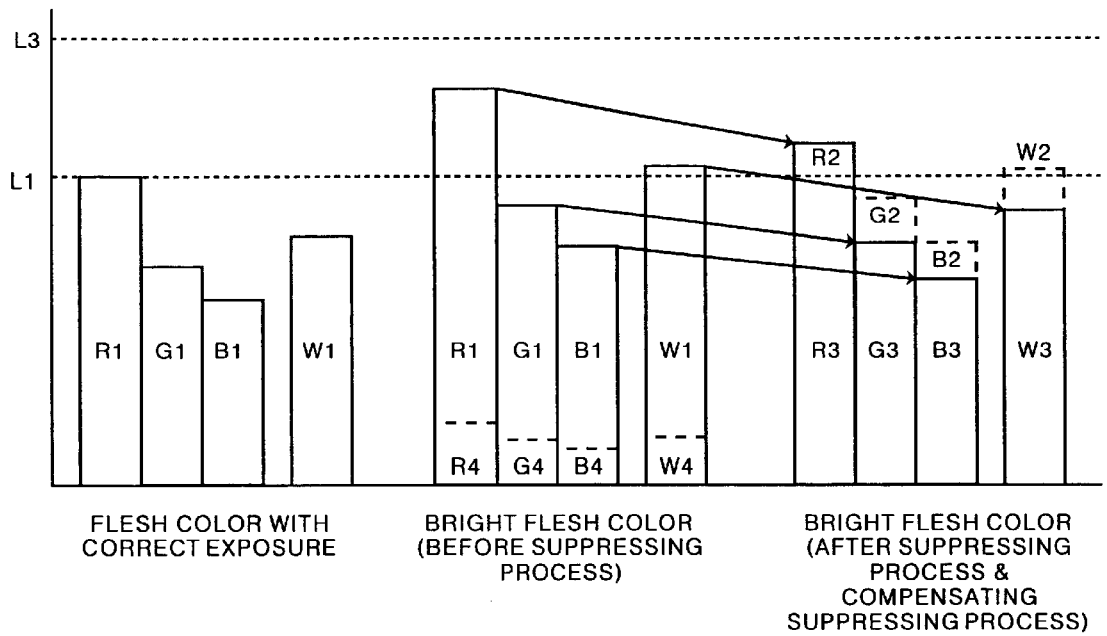

FLESH COLOR WITH
CORRECT EXPOSURE

BRIGHT FLESH COLOR
(BEFORE SUPPRESSING
PROCESS)

BRIGHT FLESH COLOR
(AFTER SUPPRESSING
PROCESS &
COMPENSATING
SUPPRESSING PROCESS)

RED WITH CORRECT EXPOSURE

BRIGHT RED (BEFORE SUPPRESSING PROCESS)

BRIGHT RED (AFTER SUPPRESSING PROCESS & COMPENSATING SUPPRESSING PROCESS)

PRIOR ART

COLOR IMAGE PROCESSING METHOD AND APPARATUS

BACKGROUND OF THE INVENTION

1. Field of the Invention

This invention relates to a color image processing method and apparatus. This invention particularly relates to a color image processing method and apparatus for a monitor camera, a medical camera, or the like, which is provided with image sensing means, such as charge coupled device (CCD) image sensor.

2. Description of the Prior Art

Color video cameras (hereinbelow referred to simply as the cameras) for recording color images, which cameras are provided with image sensing means, such as CCD image sensors, have heretofore been known. The cameras are currently used widely for broadcasting, for domestic use, as monitor cameras, as medical cameras, and the like.

In cases where a color image is recorded with the camera, if the camera is a single-plate type of camera, in order for color signals (e.g., R, G, and B three primary color signals) to be obtained from a single CCD image sensor, a color filter is superposed upon each of pixels arrayed in a two-dimensional pattern in the color image, and chrominance information is obtained in the form superimposed upon luminance information. A luminance signal and the three primary color signals (or signals in accordance with the three primary color signals) are thus separated from one another. As the color filter, a color filter array, in which three to four kinds of colors are arrayed in a dot-like pattern, is employed.

Each of the three primary color signals having been separated from one another is then subjected to white balance (WB) compensation, gamma ($\gamma$) compensation for canceling $\gamma$ characteristics of a cathode ray tube, high-level suppression processing, such as knee processing or white clipping (WC), or the like. The color signals having been obtained from the processing are fed together with the luminance signal into an output circuit for performing matrix processing, encoding processing, or the like. In this manner, the signals are transformed into R, G, and B signals of predetermined levels or video signals conforming to broadcasting standards, such as NTSC standards. As well known, the high-level suppression processing is performed in order to suppress a dynamic range of natural light to a limited signal level range in accordance with the TV signal standards. FIG. 5 is a block diagram showing signal processing in conventional cameras.

With the conventional high-level suppression processing, with respect to each of the three primary color signals, in cases where the signal level of the color signal is higher than a predetermined signal level, the color signal is suppressed. Also, the luminance signal is reproduced in accordance with the three primary color signals, which have been obtained from the suppression processing. In this manner, suppression processing on the luminance signal is performed simultaneously.

As described above, with the conventional high-level suppression processing, with respect to each of the three primary color signals, the suppression processing is performed for each color signal. Therefore, if the signal levels of the color signals are different from one another, it will occur that a certain color signal is suppressed and the other color signals are not suppressed. If a certain color signal is suppressed, the composition ratios of the colors will vary from the original composition ratios. Therefore, in cases where the conventional high-level suppression processing is performed, the problems occur in that the hue changes and the color reproducibility becomes bad (as will be described later with reference to FIGS. 8A, 8B, and 8C). For example, a phenomenon occurs in that, when a photograph of a person is taken, as an aperture is opened, flesh color becomes tinted with yellow. Also, a phenomenon occurs in that, as an aperture is opened, a single-color, high-saturation image becomes tinted with other colors. (Such phenomena will hereinbelow be referred to as the false color phenomenon.)

For example, in the cases of endoscope cameras, the region in the body cavity ordinarily has a rugged shape, and it often occurs that a pattern of a dark region and a pattern of a bright region are recorded simultaneously. In the cases of such image sensing conditions, since the dynamic range of the CCD image sensor, or the like, cannot be broadened unlimitedly, it must be selected whether an exposure quantity is to be matched with the dark region and signal components representing the bright region are to be suppressed (e.g., the bright region is rendered white such that its details become imperceptible), or the exposure quantity is to be matched with the bright region and the pattern of the dark region is to be rendered black such that its details become imperceptible. Therefore, the image quality of the pattern of the bright region or the pattern of the dark region becomes bad. Particularly, in cases where the exposure quantity is matched with the dark region and the signal components representing the bright region are suppressed, the phenomenon described below occurs. Specifically, chrominance information of the region in the body cavity is primarily composed of red color information. However, the color filter of the CCD image sensor has the characteristics such that, in such cases, besides the red color signal components, for example, green color signal components are also outputted in no small quantities. Therefore, if the red color signal components are suppressed, the ratio of the green color signal components will become comparatively high. As a result, at a highlight such that it does not become white and its details do not become imperceptible due to the signal suppression, red at a high-saturation area becomes tinted with green.

In order for the false color phenomenon to be prevented, highlight chroma suppression (HLCS) processing may be performed, and the video signals obtained from the processing may be outputted. With the HLCS processing, reference is made to a luminance signal having been separated from detected signals, and processing is performed such that, at a high luminance level such as that at which saturation of the luminance signal is reached, color signals are suppressed so as to eliminate the chrominance information, and only the luminance signal remains.

However, the HLCS processing is the one in which the color signals are suppressed at a highlight area of the luminance signal. Therefore, for example, in cases where the luminance signal is of a low level and only the red color signal is of a high level as in a red high-saturation image, the problems occur in that only the red color signal is suppressed by the high-level suppression processing, and the HLCS processing is not effected. Accordingly, the false color phenomenon occurring due to the suppression of only the red color signal cannot be prevented.

Also, with the conventional techniques, in the cases of an image containing an excessively high level of image information such that saturation of the output obtained from the image sensing operation is reached, a processed image is outputted in which a bright region has been rendered white such that its details become imperceptible. However, in the cases of the medical cameras, such as endoscope cameras, if correct chrominance information is not outputted, the problems occur in that the efficient and accurate diagnosis of an illness cannot be made. Therefore, the signal processing, in which the chrominance information is eliminated, is not appropriate for medical cameras.

SUMMARY OF THE INVENTION

The primary object of the present invention is to provide a color image processing method, wherein a false color phenomenon at a highlight area or a high-saturation area is capable of being minimized or prevented regardless of a luminance signal level.

Another object of the present invention is to provide an apparatus for carrying out the color image processing method.

The present invention provides a color image processing method, comprising the steps of:

i) performing an image sensing operation for detecting an image of an object, ii) obtaining a plurality of color signals, which carry color image information of the object, in accordance with an output having been obtained from the image sensing operation, and iii) performing a first signal suppressing process in which, in cases where a signal level of a certain color signal among the plurality of the color signals is higher than a predetermined signal level, the certain color signal is suppressed, wherein the improvement comprises the steps of:

a) controlling the image sensing operation such that an image sensing operation with a comparatively large exposure quantity and an image sensing operation with a comparatively small exposure quantity are performed alternately, b) detecting that suppression of a certain color signal among the plurality of the color signals is performed in the first signal suppressing process when the image sensing operation with a comparatively large exposure quantity is performed, c) calculating composition ratios of the plurality of the color signals, which are obtained from the image sensing operation with a comparatively small exposure quantity, and d) performing a second signal suppressing process for suppressing at least one color signal other than the certain color signal in accordance with an output, which has been obtained from the detection of suppression and which represents that the suppression of the certain color signal is performed, the second signal suppressing process being performed such that the composition ratios of a plurality of color signals, which are obtained from the second signal suppressing process, become identical with the calculated composition ratios.

In the color image processing method in accordance with the present invention, the image sensing operation is controlled such that the image sensing operation with a comparatively large exposure quantity and the image sensing operation with a comparatively small exposure quantity are performed alternately. Specifically, a single image sensing operation with a comparatively large exposure quantity and a single image sensing operation with a comparatively small exposure quantity may be performed alternately. Alternatively, several image sensing operations with a comparatively large exposure quantity and a single image sensing operation with a comparatively small exposure quantity may be performed alternately. No limitation is imposed upon the order in which the image sensing operation with a comparatively large exposure quantity and the image sensing operation with a comparatively small exposure quantity are performed.

The detection of suppression may be performed before the suppression is performed in the first signal suppressing process. Alternatively, the detection of suppression may be performed after the suppression has been performed in the first signal suppressing process.

The term "composition ratios of a plurality of color signals become identical with calculated composition ratios" as used herein means that the composition ratios of the color signal of the same color as that suppressed in the first signal suppressing process and the other color signals, which are obtained from the second signal suppressing process, become identical with the calculated composition ratios. In such cases, all of the other color signals need not necessarily be suppressed such that the composition ratios of all of the plurality of the color signals become identical with the calculated composition ratios. Specifically, only the color signal, which causes the color reproducibility to be affected adversely due to the suppression of the certain color signal performed in the first signal suppressing process, may be suppressed such that its composition ratio may become identical with the calculated composition ratio, and the composition ratios of all of the color signals other than the certain color signal need not necessarily become identical with the calculated composition ratios. However, the composition ratios of all of the plurality of the color signals should preferably become identical with the calculated composition ratios.

Also, as described above, the composition ratios of the plurality of the color signals should become identical with the calculated composition ratios. Specifically, the composition ratios of the plurality of the color signals need not necessarily become exactly identical with the calculated composition ratios. It is sufficient for the composition ratios to be obtained such that the visual adverse effects upon the color reproducibility can be restricted by the suppression of the other color signals. The term "identical" as used herein has the meaning including the composition ratios in such cases. For example, the differences among the color signals may be calculated from the calculated composition ratios, and at least one of the other color signals may be suppressed such that the differences may be kept unchanged. In this manner, the visual color reproducibility may be prevented from becoming bad.

The color image processing method in accordance with the present invention should preferably be modified such that the image sensing operation with a comparatively large exposure quantity is performed by performing exposure for a comparatively long time, and the image sensing operation with a comparatively small exposure quantity is performed by performing exposure for a comparatively short time.

The present invention also provides an apparatus for carrying out the color image processing method in accordance with the present invention. Specifically, the present invention also provides a color image processing apparatus, comprising:

i) image sensing means for performing an image sensing operation for detecting an image of an object, ii) color signals separating means for obtaining a plurality of color signals, which carry color image information of the object, in accordance with an output having been obtained from the image sensing means, and iii) first signal suppressing means for performing a first signal suppressing process in which, in cases where a signal level of a certain color signal among the plurality of the color signals is higher than a predetermined signal level, the certain color signal is suppressed, wherein the improvement comprises the provision of:

a) image sensing operation control means for causing the image sensing means to alternately perform an image sensing operation with a comparatively large exposure quantity and an image sensing operation with a comparatively small exposure quantity, b) detection means for detecting that suppression of a certain color signal among the plurality of the color signals is performed by the first signal suppressing means when the image sensing operation with a comparatively large exposure quantity is performed, c) composition ratio calculating means for calculating composition ratios of the plurality of the color signals, which are obtained from the image sensing operation with a comparatively small exposure quantity, and d) second signal suppressing means for performing a second signal suppressing process for suppressing at least one color signal other than the certain color signal in accordance with an output, which has been obtained from the detection means and which represents that the suppression of the certain color signal is performed, the second signal suppressing process being performed such that the composition ratios of a plurality of color signals, which are obtained from the second signal suppressing means, become identical with the calculated composition ratios.

In the color image processing apparatus in accordance with the present invention, the image sensing operation control means should preferably control such that the image sensing operation with a comparatively large exposure quantity is performed by performing exposure for a comparatively long time, and the image sensing operation with a comparatively small exposure quantity is performed by performing exposure for a comparatively short time.

With the color image processing method and apparatus in accordance with the present invention, in cases where a certain color signal is suppressed in the first signal suppressing process, which has the same functions as those of a signal suppressing process performed in conventional techniques, when the image sensing operation with a comparatively large exposure quantity is performed, at least one color signal other than the certain color signal is suppressed in the second signal suppressing process such that the composition ratios of a plurality of color signals, which are obtained from the second signal suppressing process, become identical with the composition ratios of the plurality of the color signals, which are obtained from the image sensing operation with a comparatively small exposure quantity. Therefore, the false color phenomenon can be prevented perfectly, and the color reproducibility can be enhanced.

Also, with the color image processing method and apparatus in accordance with the present invention, reference is made to the composition ratios of the plurality of the color signals, which are obtained from the image sensing operation with a comparatively small exposure quantity. Therefore, in cases where the image contains an excessively high level of image information such that, if the image sensing operation with a comparatively large exposure quantity is performed, the output obtained from the image sensing operation saturates, the image sensing operation with a comparatively small exposure quantity is performed, and the composition ratios can be calculated accurately from the color signals, which do not saturate. Accordingly, the color reproducibility can be enhanced over a wide dynamic range.

Further, since the false color phenomenon can be prevented over a wide range, the HLCS processing becomes unnecessary, and appropriate chrominance information can be outputted in every case. Therefore, the color image processing method and apparatus in accordance with the present invention are suitable for medical cameras, such as endoscope cameras.

Furthermore, in cases where the exposure quantity is controlled by altering the exposure time, the exposure quantity can be changed by shutter speed control, in which driving pulses for driving the CCD image sensor are controlled. Therefore, the image sensing operation with a comparatively large exposure quantity and the image sensing operation with a comparatively small exposure quantity can be alternately performed easily.

DESCRIPTION OF THE PREFERRED EMBODIMENTS

The present invention will hereinbelow be described in further detail with reference to the accompanying drawings.

Figure 1:
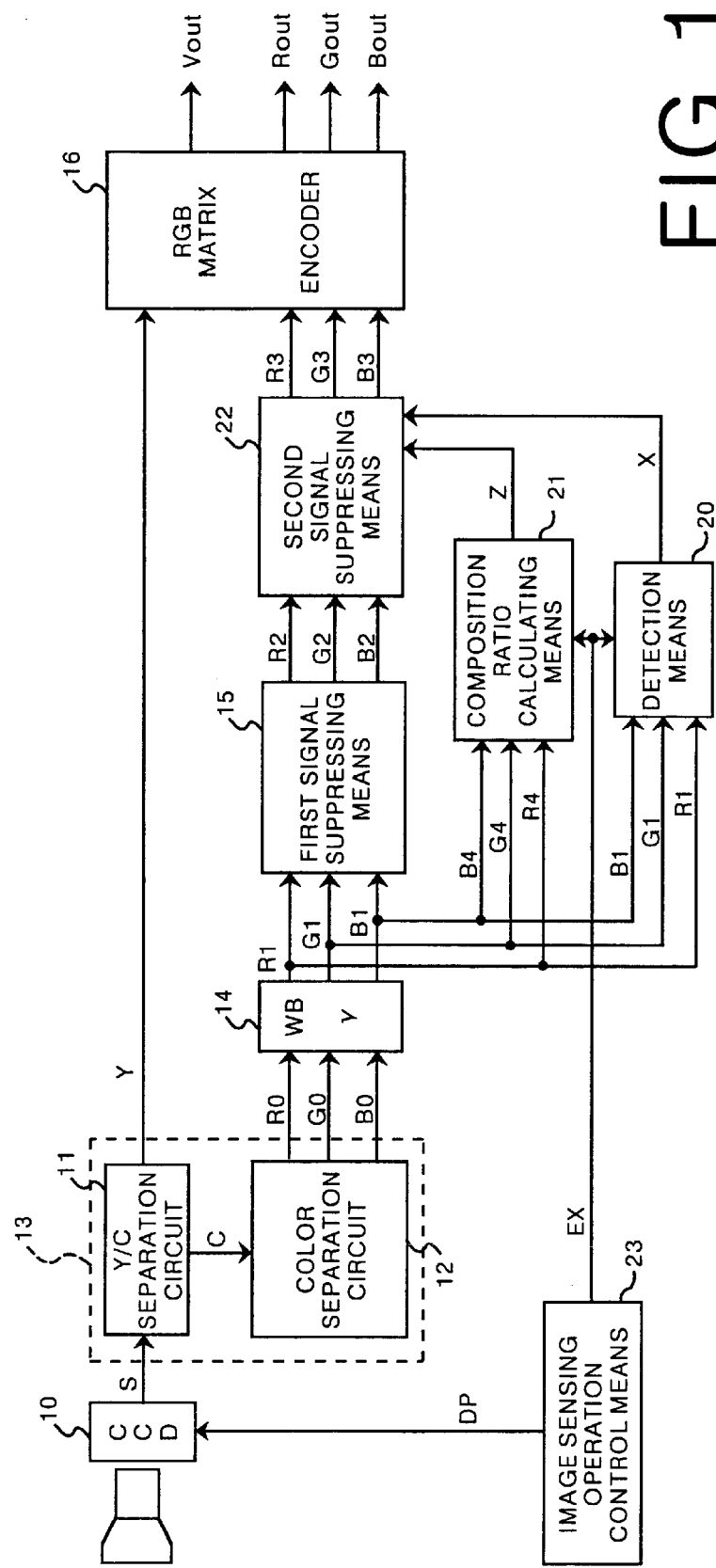
FIG. 1 is a block diagram showing an embodiment of the color image processing apparatus in accordance with the present invention.

FIG. 1 is a block diagram showing an embodiment of the color image processing apparatus in accordance with the present invention. The embodiment is appropriate for an electronic endoscope camera, or the like.

With reference to FIG. 1, the color image processing apparatus comprises image sensing means 10, which is provided with a CCD image sensor, or the like, for performing an image sensing operation for detecting an image of an object, and image sensing operation control means 23 for causing the image sensing means 10 to alternately perform an image sensing operation with a comparatively large exposure quantity and an image sensing operation with a comparatively small exposure quantity. The color image processing apparatus also comprises color signals separating means 13 for obtaining color signals R0, G0, and B0, which carry color image information of the object, in accordance with an image signal S having been obtained from image sensing means 10. The color image processing apparatus further comprises a process circuit 14 for performing WB compensation and γ compensation on each of the color signals R0, G0, and B0 and feeding out color signals R1, G1, and B1. The color image processing apparatus still further comprises first signal suppressing means 15 for performing a first signal suppressing process in which, in cases where the signal level of a certain color signal among the color signals R1, G1, and B1 having been obtained from the process circuit 14 is higher than a predetermined signal level, the certain color signal is suppressed. Color signals R2, G2, and B2 are fed out from the first signal suppressing means 15. The color image processing apparatus also comprises detection means 20 for detecting that suppression of a certain color signal among the color signals R1, G1, and B1 is performed by the first signal suppressing means 15 when the image sensing operation with a comparatively large exposure quantity is performed. The color image processing apparatus further comprises composition ratio calculating means 21 for calculating composition ratios of the color signals R1, G1, and B1, which are obtained from the image sensing operation with a comparatively small exposure quantity. The color image processing apparatus still further comprises second signal suppressing means 22 for performing a second signal suppressing process for suppressing at least one color signal R2, G2, or B2 other than the certain color signal, which is suppressed by the first signal suppressing means 15, in accordance with an output signal X, which has been obtained from the detection means 20 and which represents that the suppression of the certain color signal is performed. Color signals R3, G3, and B3 are fed out from the second signal suppressing means 22. The second signal suppressing means 22 suppresses the at least one color signal other than the certain color signal such that the composition ratios of the color signals R3, G3, and B3, which are obtained from the second signal suppressing means 22, become identical with the composition ratios having been calculated by the composition ratio calculating means 21. The color image processing apparatus also comprises an output circuit 16, which receives a luminance signal Y and the color signals R3, G3, and B3, and which feeds out predetermined output signals (video output signals, RGB output signals, or the like). The color image processing apparatus shown in FIG. 1 differs from the conventional color image processing apparatus of FIG. 6 in that the apparatus of FIG. 1 further comprises the detection means 20, the composition ratio calculating means 21, the second signal suppressing means 22, and the image sensing operation control means 23. The second signal suppressing process performed by the second signal suppressing means 22 will hereinbelow be referred to as the compensating suppressing process.

The image sensing operation control means 23 performs shutter speed control, in which driving pulses DP for driving the CCD image sensor are controlled. With the shutter speed control, the image sensing operation with a comparatively large exposure quantity is performed by performing exposure for a comparatively long time. Also, the image sensing operation with a comparatively small exposure quantity is performed by performing exposure for a comparatively short time. A signal EX, which represents whether the image sensing operation with a comparatively large exposure quantity or the image sensing operation with a comparatively small exposure quantity is being performed, is fed from the image sensing operation control means 23 into the composition ratio calculating means 21 and each of detection means 20R, 20G, and 20B (shown in FIG. 2) constituting the detection means 20.

As the CCD image sensor capable of performing the image sensing operation with a comparatively large exposure quantity and the image sensing operation with a comparatively small exposure quantity through the shutter speed control, for example, "Hyper-D CCD" (described in Transactions of The Institute of Image Electronics Engineers of Japan, Vol. 25, No. 4, pp. 397–405, 1996) is preferable. The control performed by the image sensing operation control means 23 is not limited to the shutter speed control and may be, for example, aperture control.

Figure 2:
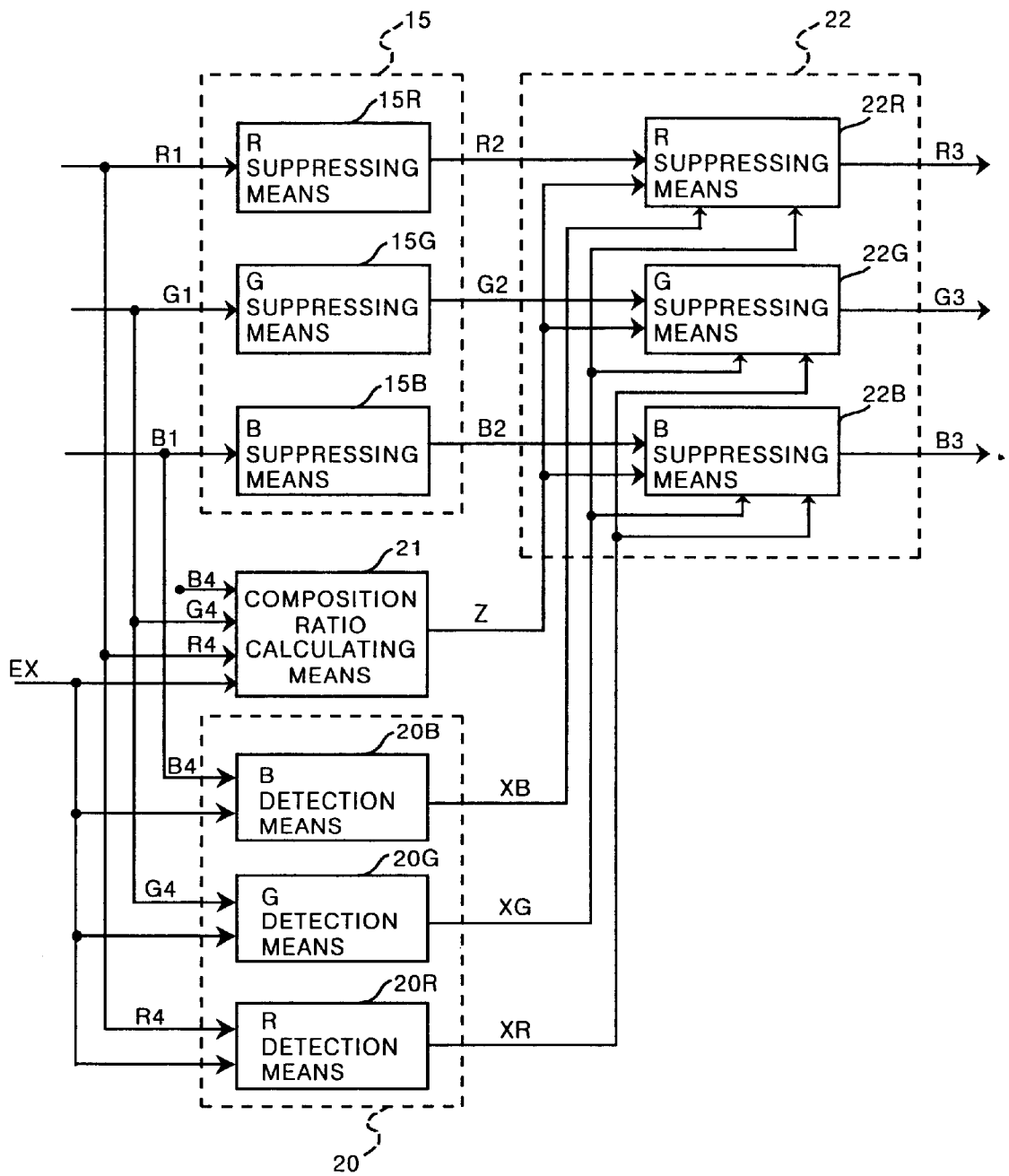
FIG. 2 is a block diagram showing first signal suppressing means, detection means, composition ratio calculating means, and second signal suppressing means in the embodiment of FIG. 1, FIGS. 3A, 3B, and 3C are explanatory graphs showing how signal suppressing process is performed in cases where an image of a flesh-color object is detected with an image sensing operation in the embodiment of FIG. 1, FIGS. 4A, 4B, and 4C are explanatory graphs showing how signal suppressing process is performed in cases where an image of a flesh-color object is detected with an image sensing operation in the embodiment of FIG. 1 (in which the exposure quantity is excessively high)

FIG. 2 is a block diagram showing the first signal suppressing means 15, the detection means 20, the composition ratio calculating means 21, and the second signal suppressing means 22. Each of the first signal suppressing means 15, the detection means 20, and the second signal suppressing means 22 is provided with constituent sections having functions for the respective color signals. In FIG. 2, the constituent sections for the respective color signals are indicated by the signs of the corresponding color signals.

A signal Z, which represents the composition ratios having been calculated by the composition ratio calculating means 21, is fed into each of second signal suppressing means 22R, 22G, and 22B for the respective colors.

The detection means 20R detects that first signal suppressing means 15R suppresses the color signal RI. The detection means 20R feeds a signal XR, which represents that the color signal R1 is suppressed, into the second signal suppressing means for suppressing the color signals other than the color signal R1, i.e. into the second signal suppressing means 22G for suppressing the color signal G2 and the second signal suppressing means 22B for suppressing the color signal B2. The detection means 20G detects that first signal suppressing means 15G suppresses the color signal G1. The detection means 20G feeds a signal XG, which represents that the color signal G1 is suppressed, into the second signal suppressing means 22R for suppressing the color signal R2 and the second signal suppressing means 22B for suppressing the color signal B2. The detection means 20B detects that first signal suppressing means 15B suppresses the color signal B1. The detection means 20B feeds a signal XB, which represents that the color signal B1 is suppressed, into the second signal suppressing means 22R for suppressing the color signal R2 and the second signal suppressing means 22G for suppressing the color signal G2.

In cases where the color image processing apparatus is utilized for an electronic endoscope camera, the image sensing means 10 is located at an end of the electronic endoscope. Though not shown, the image sensing means 10 is connected to a correlative double sampling (CDS) circuit for extracting the image signal S, and an analog-to-digital conversion circuit for digitizing the image signal S.

The color signals separating means 13 comprises a Y/C separation circuit 11 for separating the image signal S into the luminance signal Y and a color signal C, and a color separation circuit 12 for separating the color signal C into the three primary color signals R0, G0, and B0. The image signal S, which has been obtained from the digitization performed by the analog-to-digital conversion circuit (not shown), is fed into the Y/C separation circuit 11. In this embodiment, the color separation circuit 12 separates the color signal C into the three primary color signals R0, G0, and B0. However, the color image processing apparatus in accordance with the present invention is not limited to such an embodiment. Specifically, it is sufficient for the color signal C to be separated into a plurality of color signals carrying the color image information of the object, and the color separation circuit 12 may separate the color signal C into various kinds of output signals. For example, the color signal C may be separated into color difference signals "2R−G" and "2B−G."

The reproducing section 16 performs RGB matrix processing and video signal forming processing. The luminance signal Y and the color signals R3, G3, and B3 are fed into a digital-to-analog converter (not shown), and signals obtained from the digital-to-analog converter are fed into the reproducing section 16. A video signal $V_{OUT}$ and color signal outputs $R_{OUT}$, $G_{OUT}$, and $B_{OUT}$ are obtained from the reproducing section 16. The video signal $V_{OUT}$ and the color signal outputs $R_{OUT}$, $G_{OUT}$, and $B_{OUT}$ are fed into a TV monitor (not shown), or the like, and utilized for reproducing a visible image on the monitor.

How this embodiment of the color image processing apparatus in accordance with the present invention operates will be described hereinbelow.

Figure 6:
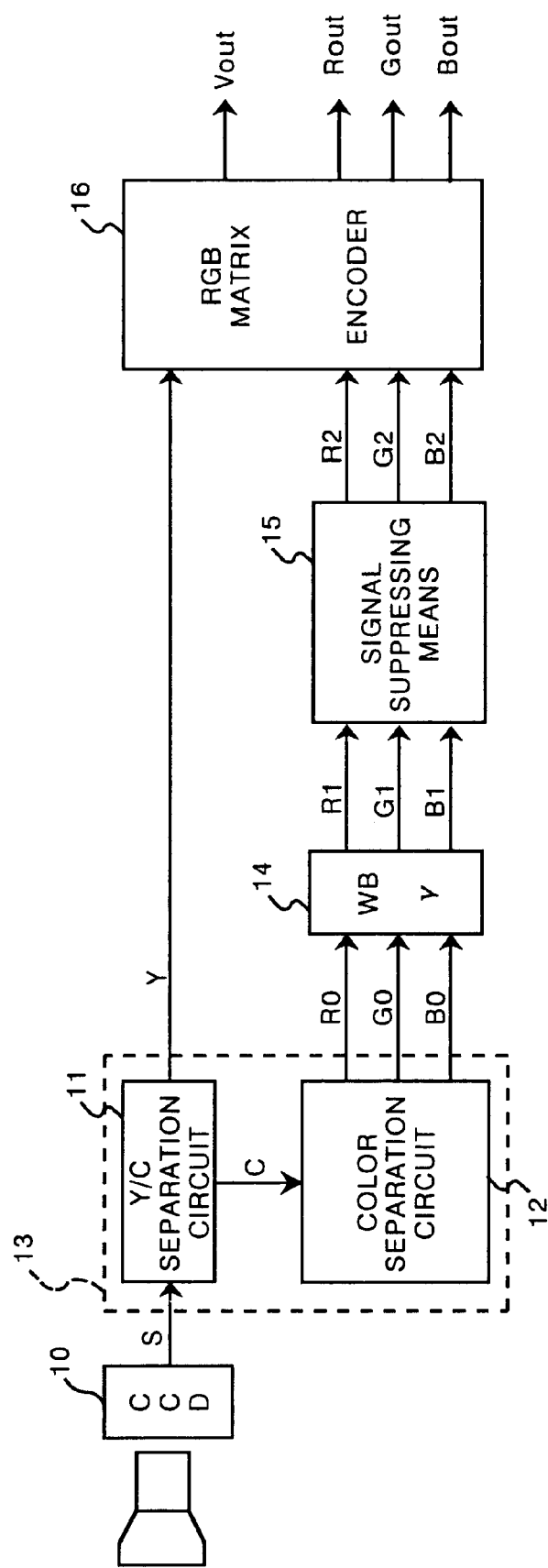
FIG. 6 is a block diagram showing a conventional color image processing apparatus.

Firstly, a signal suppressing process (in this example, knee processing and WC processing) performed in the conventional color image processing apparatus shown in FIG. 6 will be briefly described hereinbelow.

Figure 7:
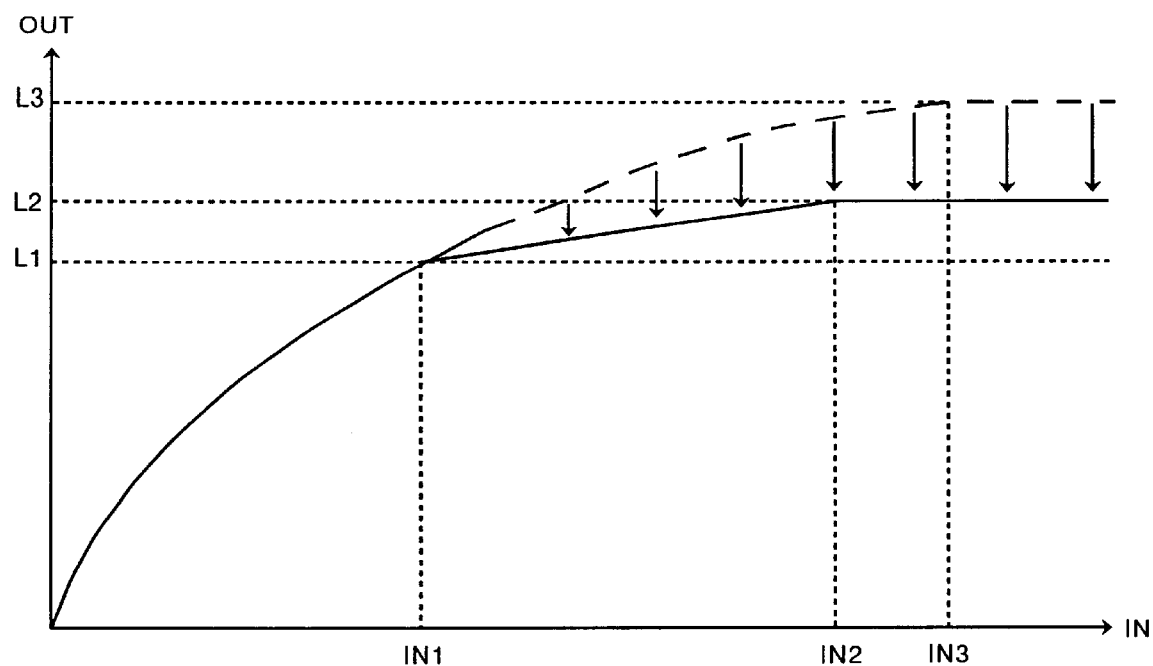
FIG. 7 is a graph showing characteristics of signal suppressing process performed in the conventional color image processing apparatus (or characteristics of signal suppressing process performed by first signal suppressing means in the color image processing apparatus in accordance with the present invention)

FIG. 7 shows a suppression characteristic curve representing the relationship between each of the color signals R1, G1, and B1 (indicated as IN), which have been obtained from γ compensation performed in the conventional color image processing apparatus, and the corresponding one of the output signals R2, G2, and B2 (indicated as OUT), which have been obtained from the suppressing process performed in the conventional color image processing apparatus. The suppression characteristic curve of FIG. 7 also represents the suppression characteristics of the first signal suppressing means 15 in the embodiment of the color image processing apparatus in accordance with the present invention.

As illustrated in FIG. 7, in cases where the input level falls within the range up to IN1, the output signal is obtained in accordance with the γ curve. In cases where the input level falls within the range of IN1 to IN2, the knee processing with a knee point taken at L1 is performed, and the output signal is suppressed. In cases where the input level is higher than IN2, the WC processing is performed, and the output signal is kept at a clipping level L2. In cases where the exposure quantity is excessively large, each of the color signals R1, G1, and B1 having been obtained from the γ compensation also saturates. Therefore, as for the input levels of IN3 and higher, the output level is kept at L3. With respect to L3, the suppressing process is performed such that the output level is kept at the clipping level L2.

Figures 8A, 8B, 8C:
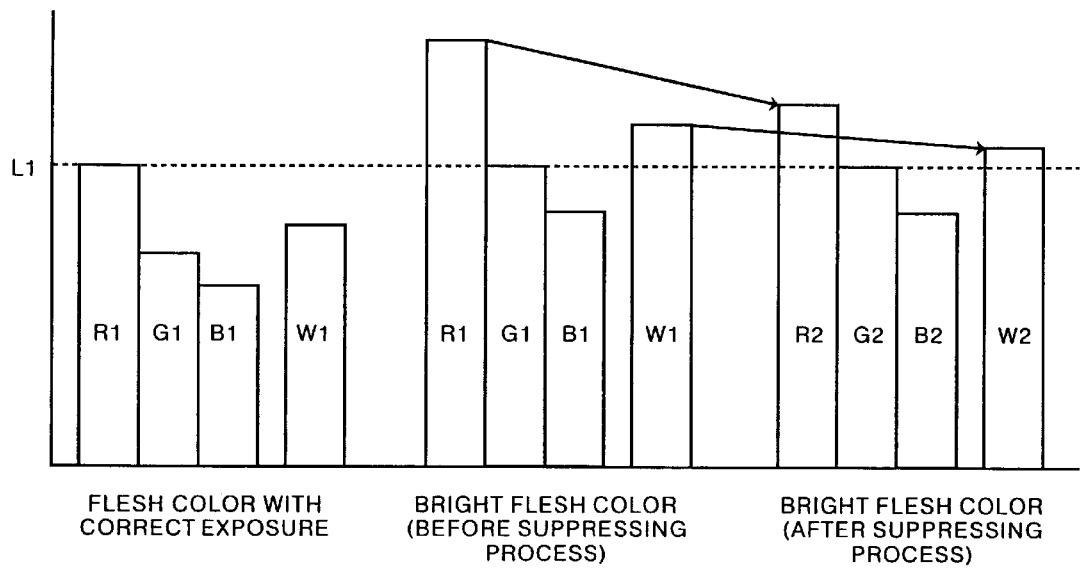
FIGS. 8A, 8B, and 8C are explanatory graphs showing how signal suppressing process is performed in cases where an image of a flesh-color object is detected with an image sensing operation in the conventional color image processing apparatus.

FIGS. 8A, 8B, and 8C are explanatory graphs showing how signal suppressing process is performed in cases where an image of a flesh-color object is detected with an image sensing operation in the conventional color image processing apparatus. In FIGS. 8A and 8B, R1, G1, and B1 represent the signal levels of the respective colors fed out from the process circuit 14, and W1 represents the luminance signal level calculated from the signal levels of the respective colors. In FIG. 8C, R2, G2, and B2 represent the signal levels of the respective colors fed out from the first signal suppressing means 15, and W2 represents the luminance signal level calculated from the signal levels of the respective colors.

In cases where an image of the flesh-color object is detected with the image sensing operation at a correct exposure level, the R, G, and B color signals have the levels shown in FIG. 8A. As illustrated in FIG. 8B, in cases where the image sensing operation is performed by setting the exposure level to be high, the R, G, and B color signals have higher levels, while their composition ratios are being kept unchanged. As illustrated in FIG. 8C, in cases where the suppressing process is performed, the region of the level higher than the knee point L1 is suppressed. Therefore, only the level of the R signal becomes low, and the levels of the G signal and the B signal do not change. As a result, the suppression of the luminance signal level is accomplished. However, the composition ratios of R to G and B become low. Accordingly, the false color phenomenon occurs such that flesh color becomes tinted with yellow, and the color reproducibility becomes bad.

The embodiment of the color image processing apparatus shown in FIG. 1 aims at minimizing or preventing the false color phenomenon described above. How the embodiment of the color image processing apparatus shown in FIG. 1 operates will be described hereinbelow.

FIGS. 3A, 3B, and 3C are explanatory graphs showing how the signal suppressing process is performed in cases where an image of a flesh-color object is detected with an image sensing operation in the embodiment of FIG. 1. In FIGS. 3A and 3B, R1, G1, and B1 represent the signal levels of the respective colors fed out from the process circuit 14, and W1 represents the luminance signal level calculated from the signal levels of the respective colors. In FIG. 3C, the signal levels R2, G2, and B2, which are indicated by the broken lines, represent the signal levels of the respective colors fed out from the first signal suppressing means 15, and W2 indicated by the broken line represents the luminance signal level calculated from the signal levels of the respective colors. Also, in FIG. 3C, the signal levels R3, G3, and B3, which are indicated by the solid lines, represent the signal levels of the respective colors fed out from the second signal suppressing means 22, and W3 indicated by the solid line represents the luminance signal level calculated from the signal levels of the respective colors. The signal levels shown in FIGS. 3A, 3B, and 3C are the ones obtained when the image sensing operation with a comparatively large exposure quantity is performed. In FIG. 3C, as for R2, its signal level is not indicated by the broken line. This is because the signal level R2 is equal to the signal level R3.

In FIG. 3B, signal levels R4, G4, and B4, which are indicated by the broken lines, represent the signal levels of the respective colors fed out from the process circuit 14 when the image sensing operation with a comparatively small exposure quantity is performed, and W4 indicated by the broken line represents the luminance signal level calculated from the signal levels of the respective colors.

Firstly, the image sensing operation control means 23 sets the shutter speed at a comparatively slow value (e.g., at 1/100 second), and the image sensing operation with a comparatively large exposure quantity is performed. In cases where an image of the flesh-color object is detected with the image sensing operation at a correct exposure level, the R, G, and B color signals have the levels shown in FIG. 3A. Thereafter, the image sensing operation is performed by setting the exposure level to be high (e.g., 1/60 second). At this time, the exposure quantity is set such that each of the color signals R1, G1, and B1 does not saturates, i.e. such that the output level of each of the color signals R1, G1, and B1 is lower than L3. In such cases, as illustrated in FIG. 3B, the R, G, and B color signals have higher levels, while their composition ratios are being kept unchanged. As indicated by the broken lines in FIG. 3C, in cases where the suppressing process is performed by the first signal suppressing means 15, the region of the level higher than the knee point L1 is suppressed. Therefore, only the level of the R signal becomes low, and the levels of the G signal and the B signal do not change. This state is the same as the state shown in FIG. 8C for the conventional color image processing apparatus.

Thereafter, the image sensing operation control means 23 sets the shutter speed at a comparatively quick value (e.g., at 1/1,000 second), and the image sensing operation with a comparatively small exposure quantity is performed. At this time, the composition ratio calculating means 21 calculates the composition ratios R4:G4:B4 of the color signals R4, G4, and B4 before being subjected to the suppression performed by the first signal suppressing means 15. The composition ratio calculating means 21 feeds the signal Z, which represents the calculated composition ratios, into each of the second signal suppressing means 22R, 22G, and 22B.

The detection means 20R monitors the color signal R1 in order to detect that the first signal suppressing means 15R suppresses the color signal R1. The detection means 20G monitors the color signal G1 in order to detect that the first signal suppressing means 15G suppresses the color signal G1. The detection means 20B monitors the color signal B1 in order to detect that the first signal suppressing means 15B suppresses the color signal B1. In this embodiment, the first signal suppressing means 15R suppresses the color signal R1. Therefore, the signal XR, which represents that the color signal R1 is suppressed, is fed from the detection means 20R into the second signal suppressing means 22G and the second signal suppressing means 22B. The signal XG, which represents that the color signal G1 is suppressed, and the signal XB, which represents that the color signal B1 is suppressed, are not fed out.

The second signal suppressing means 22R does not receive the signal XG, which represents that the color signal G1 is suppressed, and the signal XB, which represents that the color signal B1 is suppressed. The second signal suppressing means 22R outputs the received color signal R2 directly as the output signal R3. The second signal suppressing means 22G and the second signal suppressing means 22B, which have received the signal XR, which represents that the color signal R1 is suppressed, perform the compensating suppressing processes on the color signals G2 and B2, respectively. The compensating suppressing processes are performed in accordance with the signal Z, which represents the composition ratios of the color signals before being subjected to the suppressing process performed by the first signal suppressing means 15, such that the composition ratios of the color signals R3, G3, and B3, which are obtained from the second signal suppressing means 22, become identical with the calculated composition ratios. In this manner, the color signal levels change from the levels indicated by the broken lines in FIG. 3C to the levels, which are indicated by the solid lines in FIG. 3C and which are obtained from the compensating suppressing process.

As a result, regardless of the luminance signal level, the composition ratios of the ultimately obtained color signals R3, G3, and B3 become identical with the composition ratios of the color signals R4, G4, and B4, which are obtained from the image sensing operation with a comparatively small exposure quantity. Therefore, the false color phenomenon in that flesh color becomes tinted with yellow as with the conventional color image processing apparatus does not occur, and the color reproducibility does not become bad due to the suppressing process. Also, since the false color phenomenon does not occur, the HLCS processing as in the conventional color image processing apparatus becomes unnecessary, and the color image processing apparatus can be kept simple. Further, as for the color signal (in this embodiment, the R signal), which is suppressed by the first signal suppressing means 15, extension and compression are not performed, and the color signal is fed out directly. The compensating suppressing process is performed on only the other color signals (in this embodiment, the G signal and the B signal) such that the composition ratios of the color signals before being subjected to the suppressing process can be kept unchanged. Therefore, the levels of the signals fed into the output circuit at the subsequent stage do not become higher than in the conventional color image processing apparatus, and no problem occurs with regard to the dynamic range of the output circuit. Furthermore, the luminance signal level need not be referred to. Therefore, it is unnecessary for complicated processing for calculating an appropriate luminance signal level to be performed, and the constitution of the color image processing apparatus can be kept simple.

As clear from FIG. 3C, the luminance signal level decreases slightly from W2 to W3. Thus the suppressing process on the luminance signal is accomplished simultaneously.

In cases where the exposure level is set to be high and the exposure quantity is excessively high such that a color signal saturates, i.e. such that the output level of the color signal saturates at L3, the signal suppressing process is performed in the manner described below.

Figures 4A, 4B, 4C:
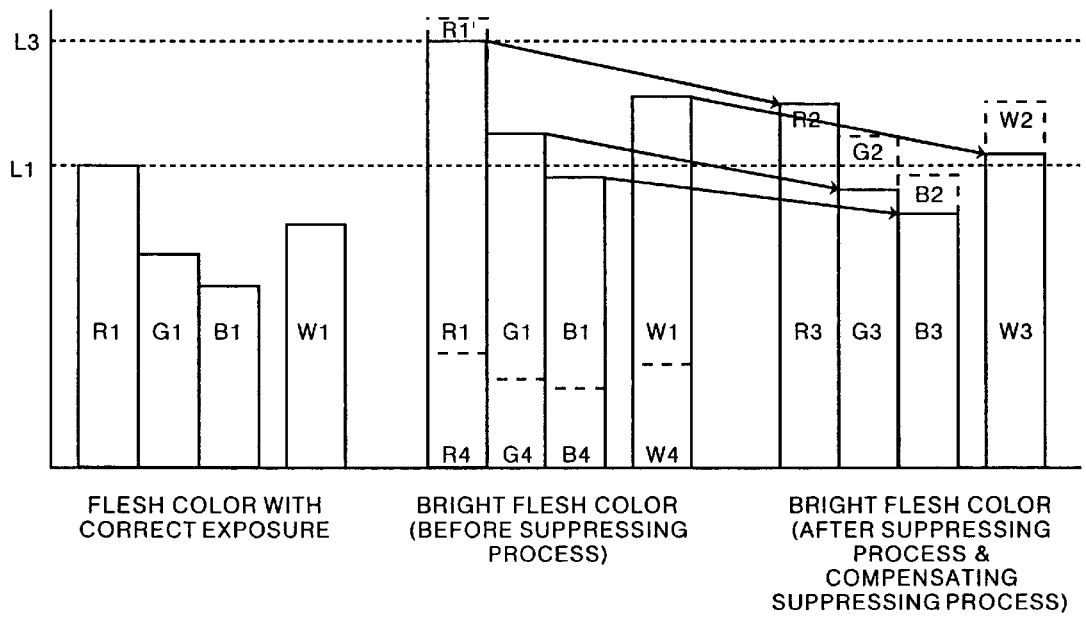

FIGS. 4A, 4B, and 4C are explanatory graphs showing how signal suppressing process is performed in cases where an image of a flesh-color object is detected with an image sensing operation in the embodiment of FIG. 1 (in which the exposure quantity is excessively high). FIGS. 4A, 4B, and 4C show the cases where the output level of the red signal R1 saturates at L3. In FIGS. 4A, 4B, and 4C, similar elements are numbered with the same reference numerals with respect to FIGS. 3A, 3B, and 3C. In FIG. 4B, R1' represents the output level obtained in cases where it is assumed that it would not saturate at L3.

Firstly, in the same manner as that described above, the image sensing operation control means 23 sets the shutter speed at a comparatively slow value (e.g., at 1/100 second), and the image sensing operation with a comparatively large exposure quantity is performed. As illustrated in FIG. 4A, in cases where an image of the flesh-color object is detected with the image sensing operation at a correct exposure level, the R, G, and B color signals have the same levels as those shown in FIG. 3A.

Thereafter, the image sensing operation is performed with excessive exposure such that the red signal R1 saturates. In such cases, as illustrated in FIG. 4B, the G and B color signals have higher levels, while their composition ratio is being kept unchanged. The red signal has the level R1', its composition ratio cannot be kept the same, and it saturates at L3.

As indicated by the broken lines in FIG. 4C, in cases where the suppressing process is performed by the first signal suppressing means 15, the region of the level higher than the knee point L1 is suppressed. Therefore, only the level of the R signal becomes low, and the levels of the G signal and the B signal do not change. This state is similar to the state shown in 3C. However, in this case, at the stage prior to the suppressing process performed by the first signal suppressing means 15, the composition ratio of R to G and B has already become lower than the actual value. Therefore, there is the risk that the false color phenomenon will occur markedly.

The embodiment of the color image processing apparatus in accordance with the present invention, which is shown in FIG. 1, is capable of minimizing or preventing the false color phenomenon in cases where the exposure quantity is excessively high such that one of color signals saturates. How the false color phenomenon is minimized or prevented will be described hereinbelow.

In the same manner as that described above, the image sensing operation control means 23 sets the shutter speed at a comparatively quick value, and the image sensing operation with a comparatively small exposure quantity is performed. At this time, the composition ratio calculating means 21 calculates the composition ratios R4:G4:B4 of the color signals R4, G4, and B4 before being subjected to the suppression performed by the first signal suppressing means 15. The composition ratio calculating means 21 feeds the signal Z, which represents the calculated composition ratios, into each of second signal suppressing means 22R, 22G, and 22B. In such cases, since the image sensing operation with a comparatively small exposure quantity is performed, each of the color signals R4, G4, and B4 does not saturates, and their composition ratios can be calculated accurately.

The second signal suppressing means 22 performs the compensating suppressing processes on the color signals G2 and B2 such that the composition ratios of the color signals R3, G3, and B3, which are obtained from the second signal suppressing means 22, become identical with the calculated composition ratios. In this manner, the color signal levels change from the levels indicated by the broken lines in FIG. 4C to the levels, which are indicated by the solid lines in FIG. 4C and which are obtained from the compensating suppressing process.

As a result, regardless of the luminance signal level and even in cases where one of the color signals saturates due to excessive exposure, the composition ratios of the ultimately obtained color signals R3, G3, and B3 become identical with the composition ratios of the color signals R4, G4, and B4, which are obtained from the image sensing operation with a comparatively small exposure quantity and which do not saturate. Therefore, the false color phenomenon does not occur.

It may be considered that, when the compensating suppressing process is performed in order to minimize or prevent the false color phenomenon, the composition ratios of the color signals R1, G1, and B1 before being subjected to the suppressing process performed by the first signal suppressing means 15 may be calculated, and the compensating suppressing process may be performed in accordance with the results of the calculation. However, as described above, in the cases of the excessive exposure, one of the color signals saturates, and the composition ratios cannot be calculated accurately. With the embodiment of the color image processing apparatus in accordance with the present invention, even in the cases of the excessive exposure, the composition ratios can be calculated accurately, and the color reproducibility can be enhanced over a wide dynamic range. Therefore, large effects are obtained with the color image processing apparatus in accordance with the present invention.

Further, since the false color phenomenon can be prevented over a wide range, the HLCS processing becomes unnecessary, and appropriate chrominance information can be outputted even in the cases of the excessive exposure. Therefore, the embodiment of the color image processing apparatus in accordance with the present invention is suitable for medical cameras, such as endoscope cameras.

In the embodiment described above, all of the color signals other than the color signal having been suppressed by the first signal suppressing means 15 are suppressed by the second signal suppressing means 22 such that the composition ratios of the color signals can be kept unchanged. However, the color image processing apparatus in accordance with the present invention is not limited to the embodiment in which all of the other color signals are suppressed by the second signal suppressing means 22. For example, only the color signal, which causes the visual color reproducibility to be affected adversely due to the false color phenomenon, may be suppressed by the second signal suppressing means 22. Such an embodiment will be described hereinbelow with reference to FIGS. 5A, 5B, and 5C.

Figures 5A, 5B, 5C:
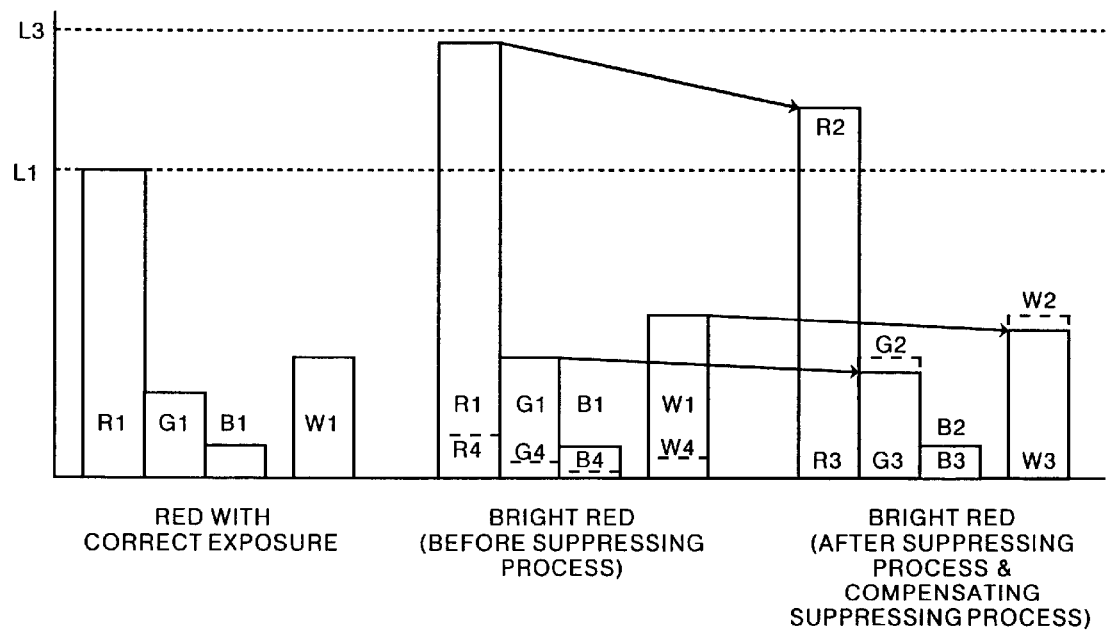
FIGS. 5A, 5B, and 5C are explanatory graphs showing how signal suppressing process is performed in cases where an image of a high-saturation red object is detected with an image sensing operation in the embodiment of FIG. 1.

FIGS. 5A, 5B, and 5C are explanatory graphs showing how signal suppressing process is performed in cases where an image of a high-saturation red object, such as the region in the body cavity, is detected with an image sensing operation in the color image processing apparatus in accordance with the present invention. In FIGS. 5A, 5B, and 5C, similar elements are numbered with the same reference numerals with respect to FIGS. 3A, 3B, and 3C.

In cases where an image of the object is detected with the image sensing operation at a correct exposure level, the R, G, and B color signals have the levels shown in FIG. 5A. In cases where the object is of the single color (red), because of the characteristics of the color filter of the CCD image sensor, the R signal having a high level and the G signal and the B signal, which have low levels, are outputted. As illustrated in FIG. 5B, in cases where the image sensing operation is performed by setting the exposure level to be high, the R, G, and B color signals have higher levels, while their composition ratios are being kept unchanged. As indicated by the broken lines in FIG. 5C, in cases where the suppressing process is performed by the first signal suppressing means 15, the region of the level higher than the knee point L1 is suppressed. Therefore, only the level of the R signal becomes low, and the levels of the G signal and the B signal do not change.

Thereafter, the image sensing operation control means 23 sets the shutter speed at a comparatively quick value, and the image sensing operation with a comparatively small exposure quantity is performed. At this time, the composition ratio calculating means 21 calculates the composition ratios R4:G4:B4 of the color signals R4, G4, and B4 before being subjected to the suppression performed by the first signal suppressing means 15. The composition ratio calculating means 21 feeds the signal Z, which represents the calculated composition ratios, into each of the second signal suppressing means 22R, 22G, and 22B.

In the manner as that described above, the signal XR, which represents that the color signal R1 is suppressed, is fed from the detection means 20R into the second signal suppressing means 22G and the second signal suppressing means 22B. The signal XG, which represents that the color signal G1 is suppressed, and the signal XB, which represents that the color signal B1 is suppressed, are not fed out. Therefore, the second signal suppressing means 22R outputs the received color signal R2 directly as the output signal R3.

When the levels of the color signal G2 and the color signal B2 are compared with each other, the level of the color signal B2 is markedly lower than the level of the color signal G2. Also, the visual sensitivity is low with respect to blue color, and therefore the color signal B2 has little adverse effects of causing the false color phenomenon to occur.

Therefore, the second signal suppressing means 22B, which has received the signal XR representing the color signal R1 is suppressed, does not perform the aforesaid compensating suppressing process on the color signal B2. The compensating suppressing process is performed only on the color signal G2 such that the composition ratio of the color signals R3 and G3 becomes identical with the composition ratio of R1 and G1. In this manner, the color signal levels change from the levels indicated by the broken lines in FIG. 5C to the levels, which are indicated by the solid lines in FIG. 5C and which are obtained from the compensating suppressing process.

As a result, the composition ratio of the ultimately obtained color signals R3 and G3 becomes identical with the composition ratio of the color signals R4 and G4, which are obtained from the image sensing operation with a comparatively small exposure quantity. Therefore, the false color phenomenon in that red color becomes tinted with green as with the conventional color image processing apparatus does not occur, and the color reproducibility does not become bad due to the compensating suppressing process performed on only the G signal.

In this example, even in the cases of the excessive exposure such that the red color signal saturates, the false color phenomenon can be minimized or prevented appropriately.

In the embodiment described above, at least one of the color signals other than the color signal suppressed by the first signal suppressing means 15 is suppressed by the second signal suppressing means 22 such that the composition ratios of the color signals, which are obtained from the image sensing operation with a comparatively small exposure quantity, may be exactly kept unchanged. However, the color image processing apparatus in accordance with the present invention is not limited to the cases where at least one of the other color signals is suppressed by the second signal suppressing means 22 such that the composition ratios of the color signals may be exactly kept unchanged. It is sufficient for the composition ratios to be obtained such that the visual adverse effects upon the color reproducibility can be restricted by the suppression of the other color signals. This is because, even if the composition ratios of the color signals are not exactly kept the same, in cases where at least one of the other color signals is suppressed when a certain color signal has been suppressed by the first signal suppressing means 15, the false color phenomenon can be reduced by the signal suppression, and the color reproducibility can be enhanced. For example, the differences among the color signals may be calculated from the composition ratios of the color signals, which are obtained from the image sensing operation with a comparatively small exposure quantity, and at least one of the other color signals may be suppressed such that the differences may be kept unchanged. Alternatively, regardless of the composition ratios or the differences, signal suppression may be effected by a predetermined level.

Further, in the embodiment described above, the detection means 20 monitors the color signals R1, G1, and B1 before being subjected to the suppressing process performed by the first signal suppressing means 15, and detects that the first signal suppressing means 15 suppresses a certain color signal among the color signals R1, G1, and B1. However, the color image processing apparatus in accordance with the present invention is not limited to such a constitution and may have one of various other constitutions, with which it can be detected that the first signal suppressing means 15 suppresses a certain color signal among the color signals R1, G1, and B1. Specifically, the detection may be performed by monitoring the color signals (e.g., R2, G2, and B2) after being subjected to the suppressing process performed by the first signal suppressing means 15.

What is claimed is:

1. A color image processing method, comprising the steps of:
   i) performing an image sensing operation for detecting an image of an object,
   ii) obtaining a plurality of color signals, which carry color image information of the object, in accordance with an output having been obtained from the image sensing operation, and
   iii) performing a first signal suppressing process in which, in cases where a signal level of a certain color signal among the plurality of the color signals is higher than a predetermined signal level, the certain color signal is suppressed,
   wherein the improvement comprises the steps of:
      a) controlling the image sensing operation such that an image sensing operation with a comparatively large exposure quantity and an image sensing operation with a comparatively small exposure quantity are performed alternately,
      b) detecting that suppression of a certain color signal among the plurality of the color signals is performed in the first signal suppressing process when said image sensing operation with a comparatively large exposure quantity is performed,
      c) calculating composition ratios of the plurality of the color signals, which are obtained from said image sensing operation with a comparatively small exposure quantity, and
      d) performing a second signal suppressing process for suppressing at least one color signal other than said certain color signal in accordance with an output, which has been obtained from said detection of suppression and which represents that said suppression of said certain color signal is performed, said second signal suppressing process being performed such that the composition ratios of a plurality of color signals, which are obtained from said second signal suppressing process, become identical with said calculated composition ratios.

2. A method as defined in claim 1 wherein said image sensing operation with a comparatively large exposure quantity is performed by performing exposure for a comparatively long time, and said image sensing operation with a comparatively small exposure quantity is performed by performing exposure for a comparatively short time.

3. A color image processing apparatus, comprising:

i) image sensing means for performing an image sensing operation for detecting an image of an object, ii) color signals separating means for obtaining a plurality of color signals, which carry color image information of the object, in accordance with an output having been obtained from the image sensing means, and iii) first signal suppressing means for performing a first signal suppressing process in which, in cases where a signal level of a certain color signal among the plurality of the color signals is higher than a predetermined signal level, the certain color signal is suppressed, wherein the improvement comprises the provision of:
  a) image sensing operation control means for causing said image sensing means to alternately perform an image sensing operation with a comparatively large exposure quantity and an image sensing operation with a comparatively small exposure quantity,
  b) detection means for detecting that suppression of a certain color signal among the plurality of the color signals is performed by the first signal suppressing means when said image sensing operation with a comparatively large exposure quantity is performed,
  c) composition ratio calculating means for calculating composition ratios of the plurality of the color signals, which are obtained from said image sensing operation with a comparatively small exposure quantity, and
  d) second signal suppressing means for performing a second signal suppressing process for suppressing at least one color signal other than said certain color signal in accordance with an output, which has been obtained from said detection means and which represents that said suppression of said certain color signal is performed, said second signal suppressing process being performed such that the composition ratios of a plurality of color signals, which are obtained from said second signal suppressing means, become identical with said calculated composition ratios.

4. An apparatus as defined in claim 3 wherein said image sensing operation control means controls such that said image sensing operation with a comparatively large exposure quantity is performed by performing exposure for a comparatively long time, and said image sensing operation with a comparatively small exposure quantity is performed by performing exposure for a comparatively short time.

* * * * *